Sept. 14, 1965 W. A. TAYLOR 3,205,704
THRUSTMETERS
Filed July 24, 1961 4 Sheets-Sheet 1

INVENTOR
William A. Taylor

BY Wilkinson, Mawhinney & Theibautt
ATTORNEYS

INVENTOR
William A. Taylor

INVENTOR
William A. Taylor

INVENTOR
William A. Taylor 3,205,704
THRUSTMETERS
William A. Taylor, San Antonio, Tex., assignor, by direct and mesne assignments, to Tel-Thrust Corporation, San Antonio, Tex., a corporation of Texas
Filed July 24, 1961, Ser. No. 126,329
1 Claim. (73—116)

The present invention relates to thrustmeters which may be employed also as torque meters and which find application in aircraft, land vehicle and water vehicle arts.

In the aircraft industry the measuring of thrust of turbo-jet engines has posed considerable problems since many attempts in this field have been directed along the line of differentially measuring ambient pressure and turbine outlet pressure. Considerable thought has been given to attempts to measure the velocity and reaction of gases issuing from a thrust nozzle and relating same as a function of thrust.

The present invention finds its greatest utility in a recognition of the fact that a gas turbine engine in an aircraft is mounted in a nacelle and when the engine is accelerated and its thrust increased, the mounting between the engine and the nacelle flexes and such flexure is rearwardly of the axis of the aircraft during acceleration and forwardly of such axis on deceleration. In short, the engine drags the aeroframe with it. I have found that the angle of flexure is directly related to the amount of thrust developed by the engine and that by measuring or sensing this flexure angle between the engine mount and a static portion of the aeroframe, which may be the nacelle housing or its internal frame, the thrust of the engine may be ascertained either by way of direct pounds thrust or percentage of total maximum thrust of the engine. Thrust tables are available and known in the art for given rated horsepower of turbo-jet engines as well as reciprocating aircraft engines and as well as land vehicle motors.

A still further object of the present invention is to provide an electrical measuring unit which employs a variable resistor stack, which stack consists of carbon wafers and metallic wafers. The metallic wafers may be placed one against another or may be spaced in the carbon wafer group. I have found in operation that aircraft at ground level is subjected to one temperature and when flying at high altitudes is subjected to a temperature of a different order. The variations in temperature are important in determining the resistance stack for the reason that as the carbon wafers change in resistance due to temperature variation the metallic wafers have a different coefficient of resistance with respect to temperature change and the mixture of carbon and metal wafers stabilize and more nearly approach a true linear function of output of the compressible stack irrespective of temperature variation.

Since the flexure angle between the engine mount and the engine moves over a relatively short distance from engine idling thrust to full power thrust as employed during takeoff or all-out level flight, the present invention contemplates means for sensing the flexure angle and communicating the angular change between the engine mount and the static frame to the electrical stack of carbon and metallic wafers in such a way that the flex angle imposes a pressure upon the carbon-metal electrical stack which is directly proportional to the angle of change and which will vary the resistance in an electrical metering circuit in which exact proportion. The electrical stack acted upon by the sensing means is placed in series with an electrical meter which will indicate the pounds thrust or percent of thrust of the engine.

As a further object of the present invention, since all engine nacelle mounts are not physically identical and the flexure angle on some mounts will be smaller than on others, means is provided for compensating for the variations in engine mounts whereby if the flexure angle is very small the sensing means can be arranged so as to provide a linear travel over a greater distance for a particular electrical output from the stack and if the movement is larger the linear movement of the sensing means may be reduced in order that the stack pressure will operate within an optimum compression physical distance.

A still further object of the present invention is to provide means, once the mechanical throw of the sensing device is ascertained and set, whereby the electrical stack may be electrically zero-ized with respect to the metering apparatus.

With the foregoing and other objects in view, the invention will be more fully described hereinafter, and will be more particularly pointed out in the claim appended hereto.

In the drawings, wherein like symbols refer to like or corresponding parts throughout the several views.

Figure 1:
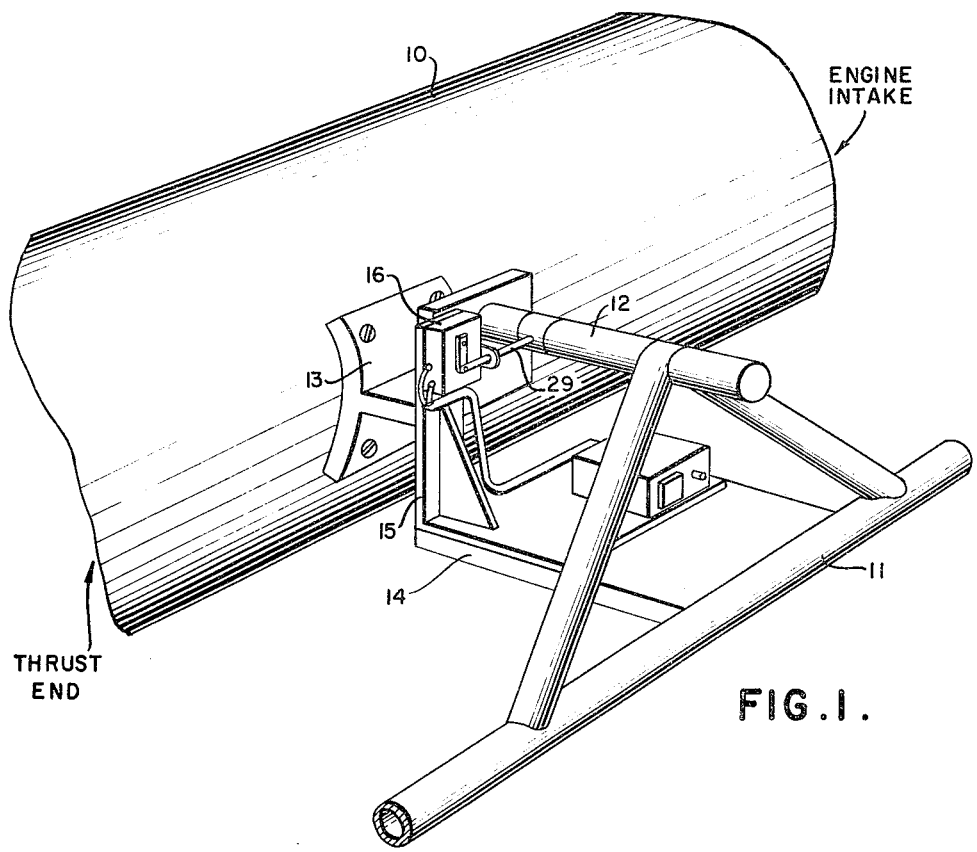
FIGURE 1 is a fragmentary perspective view with parts broken away and parts shown in section of the transmitter assembly of the present invention as applied to the mount bearings of a turbo-jet engine.
Figure 9:
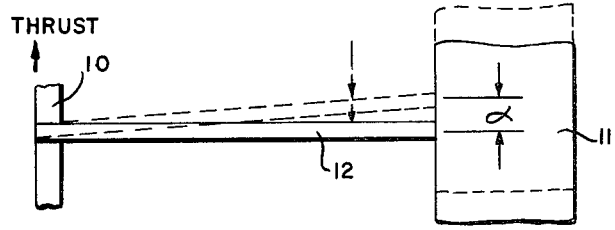
FIGURE 9 is a schematic fragmentary view showing the flexure angle between a static part of the aeroframe and the engine.

Referring more particularly to the drawings and for the moment to FIGURES 1 and 9, 10 designates a turbo-jet or gas turbine engine, or the same may be a reciprocating engine which is mounted in a nacelle housing or frame 11 which is connected to and forms a part of the aeroframe of an aircraft.

The engine is secured in place in the aeroframe structure by an engine mount member 12 and anchoring means 13. Secured to the aeroframe is a base plate 14 which has an upstanding standard 15 upon which is secured an electrical stack housing 16.

As shown diagrammatically in FIGURE 9, when the engine thrust is directed rearwardly in the direction of the arrow the engine tends to move forward with respect to the aeroframe member 11, that is to say the aeroframe tends to drag behind the engine and such deflection is shown by way of dotted line example. As shown by the letter alpha in FIGURE 9 the distance of deflection or bend moment of the engine mount member 12 is a function of thrust developed by the engine. As thrust increases alpha will increase and conversely as thrust decreases alpha will decrease. The important phase of the instant invention is the provision of means for measuring the amount of thrust by way of relating the deflection angle alpha of the engine mount member 12 to an electrical output, which electrical quantity is generated proportional to the deflection angle of the engine mount member 12.

Turning now to the electrical stack 16 and considering in particular FIGURES 3, 4 and 5, 17 designates generally an electrical stack which consists of a glass rod 18, contact members 19 between which are carried on the glass rod, carbon wafers 20 and metallic wafers 21. The electrical stack is compressed by a plunger 22 which is secured to and movable with a pivoted arm 23. The pivoted arm is actuated by a rock shaft 24 which is keyed to drive the pivoted arm by a key 25. The stack 17 may be electrically zeroed through a spring 26, the energy of which may be regulated through an adjusting screw 27 which has a threaded nut 27$^a$ secured to the housing 16.

Figure 2:
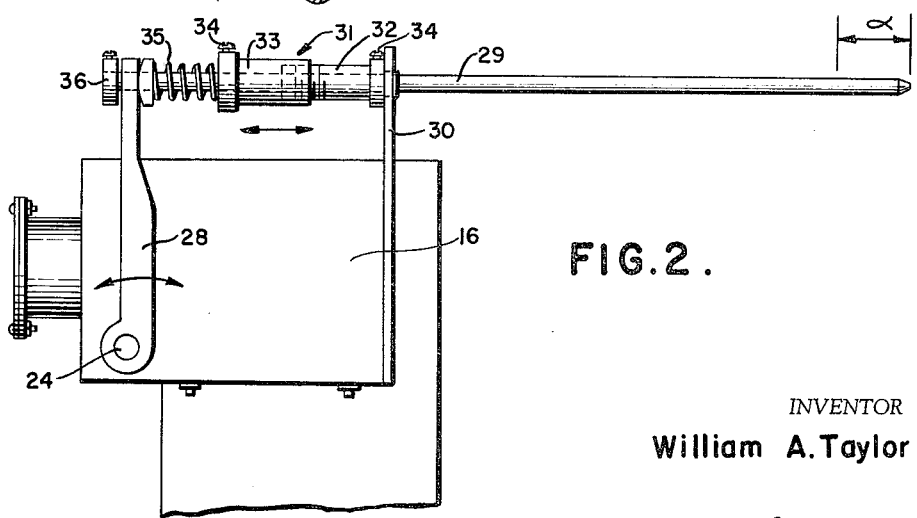
FIGURE 2 is a fragmentary side elevational view of a modified form of mechanical sensing means employed with the present invention.
Figure 3:
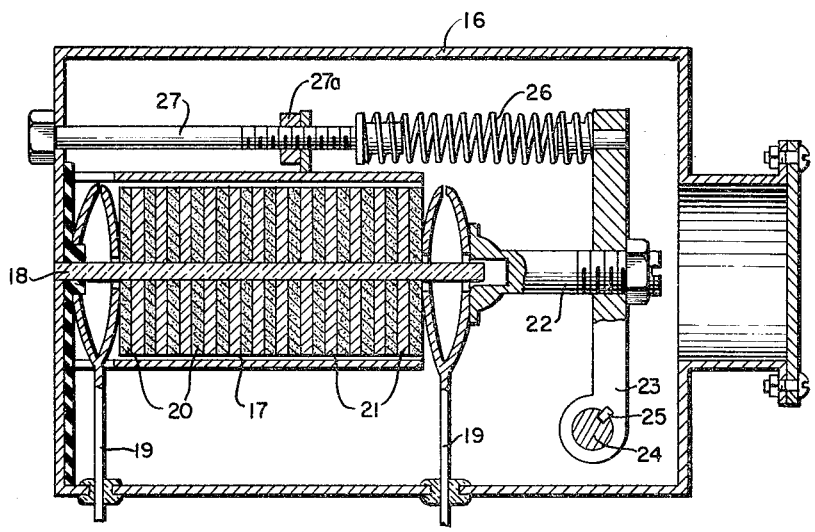
FIGURE 3 is a longitudinal section taken at a magnified scale through the housing containing the electrical stack constructed in accordance with the present invention and as applied to the form of device shown in FIGURE 2.

The mechanical structure for compressing the electrical stack 17 is seen in FIGURE 2 in which the rock shaft 24 is compelled to move through an arcuate path as shown by the arrow by a rock arm 28 which is secured to rotate with the shaft 24 and in fact compels rotation of shaft 24. The rock arm 28 is caused to partake of its arcuate motion by entrainment with a deflection sensing shaft 29, which shaft has its free end placed against the engine mount 12.

The housing 16 has a guide member 30 through which the shaft 29 passes. The other end of the shaft 29 carries thereon a transfer limit member 31 which consists of a primary member 32 threadedly received within a secondary member 33. Both of these members may be locked to the shaft 29 by screws 34. The purpose of the transfer limit member 31 is to control or regulate the linear distance of travel of the deflection sensing shaft 29 through a linear distance equal to the angle alpha. A collar on the member 33 abuts and compresses a spring 35 which bears against the rock arm 28. A fastening member 36 is secured to the opposite end of the shaft 29.

Figure 5:
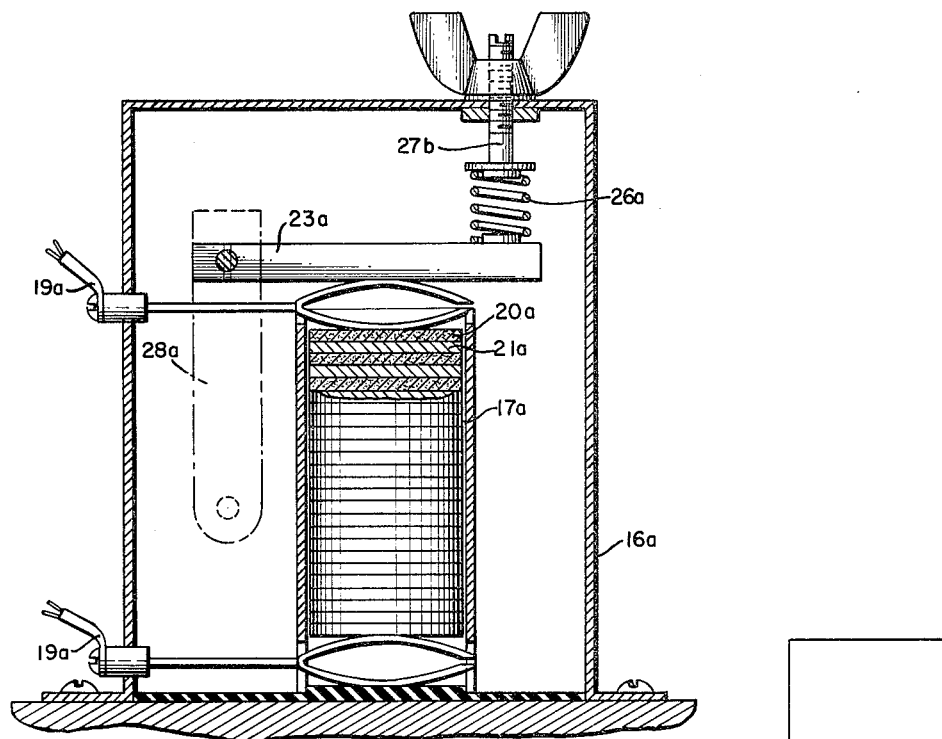
FIGURE 5 is a vertical section taken through the electrical stack and its housing as employed in FIGURE 1.

The particular form of electrical stack housing and its linkage for operation is shown in FIGURE 5 wherein a rock shaft 28$^a$ causes a pivoted arm 23$^a$ to compress a stack 17$^a$ of carbon wafers 20$^a$ and metallic wafers 21$^a$ and provide an electrical output value on the terminals 19$^a$. The form of unit in FIGURE 5 is electrically zeroized by means of a spring 26$^a$, the compression of which may be regulated through a threaded shaft 27$^b$ under the influence of a wing nut.

Figure 6:
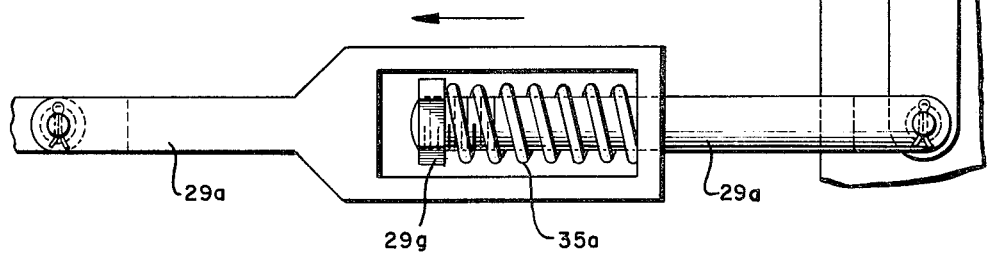
FIGURE 6 is a fragmentary view of a mechanical adjusting means for adjusting the length of throw of the sensing means with respect to the angle of compression of the electrical stack.
Figure 7:
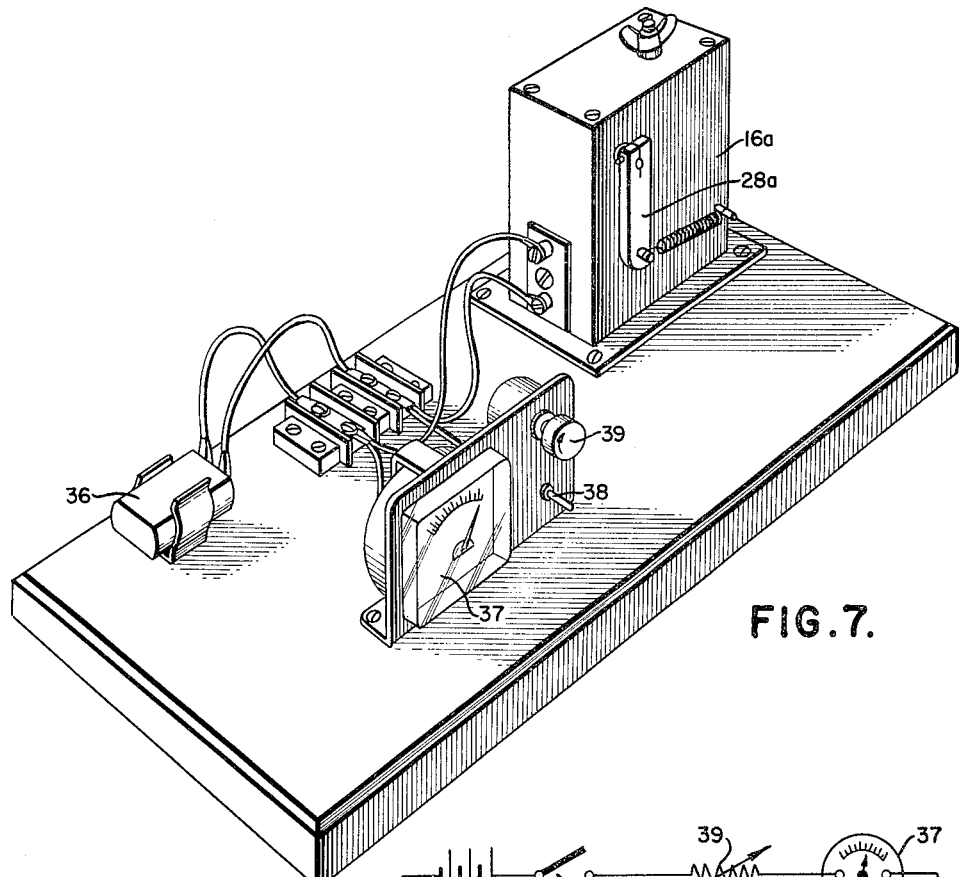
FIGURE 7 is a perspective view of a bread board circuit for illustrating the conversion of mechanical throw of the sensing means to electrical output.

The form of electrical stack housing is mechanically actuated by the linkage shown in FIGURE 6 wherein the sensing arm 29$^a$ is connected to the rock arm 28$^a$ through a plunger 29$^b$ which has a threaded regulating member 29$^c$ for compressing a spring 35$^a$.

Figure 4:
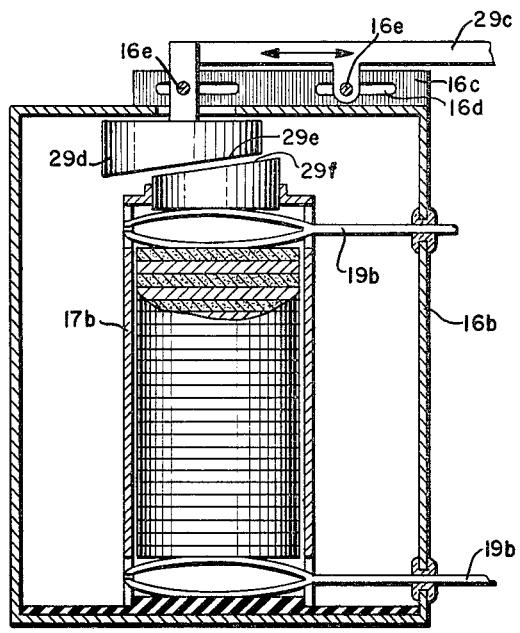
FIGURE 4 is a further modified form of stack to be employed in accordance with the present invention in lieu of the stack of FIGURE 3.

Referring now to FIGURE 4, a still further modified form of electrical stack housing is illustrated in which the housing 16$^b$ has mounted thereon a guide 16$^c$ having slots therein 16$^d$ which accommodate pins 16$^e$ carried in extensions of the sensing arm 29$^c$. Carried by the sensing arm 29$^c$ is a block member 29$^d$ having an inclined wall 29$^e$, which inclined wall is complemental to an inclined wall 29$^f$ in the electrical stack 17$^b$. The stack 17$^b$ internally is identical to the stacks shown in FIGURES 3 and 5 and likewise has terminals 19$^b$ for connecting the output of the stack into a metering circuit.

Figure 8:
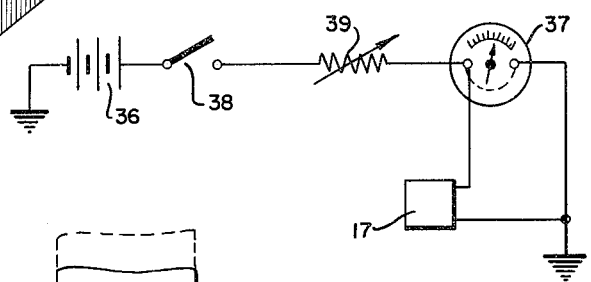
FIGURE 8 is a schematic of the electrical system of the device of the present invention.

Referring now to FIGURE 8, an electrical circiut is shown in which a battery 36 provides the energy for impressing a voltage upon the stack 17, which stack is connected into a metering circuit containing a meter 37 which is calibrated to read in pounds thrust or torque and which is a milliammeter. A switch 38 is in the circuit for selectively electrically de-energizing the circuit when not in use. A potentiometer 39 is placed in series with the circuit for electrically balancing the circuit due to variations in battery voltage.

Considering now the electrical stack 17, it will be noted that the wafers employed in the stack are a mixture of metal and carbon. In view of aircraft use and rapid changes in temperature to which aircraft are subjected and in view of the fact that carbon, when heated, decreases in resistance value, the stabilization of the stack is attained by placing therein metallic discs having a different coefficient of resistance due to heat than the mere carbon stack by itself.

The electrical stack employs the glass rod 18 down the center to hold the carbon and metal wafers in proper position for optimum area contact and to prohibit shifting laterally of the axis of the stack. While glass is given as an example, it will be appreciated by those skilled in the art that any other non-conductor substance may be employed such as porcelain, plastic, etc. I have found in practice that tin wafers work particularly well with the carbon wafers to give a more linear signal from the stack acting to counteract the resistance change due to temperature change effect of the carbon wafers. I have also found that a combination of several different types of metallic wafers in the stack will stabilize the resistance change of carbon brought about by temperature range. Metallic wafers which have been found to be successful have been brass, copper, iron and tin and I have further found that whether the metallic wafers are placed adjacent one another or are disposed with carbon wafers between metal wafers, little or no operational results are affected. Once the temperature range through which the device is to function is ascertained the metals may be selected to employ the maximum stability for the electrical stack to properly operate within the range.

It will of course be appreciated by those skilled in the art that to increase the resistance in the circuit the stack is relaxed and that to decrease the resistance in the circuit the stack is to be compressed. The meter 37 may be calibrated to read in pounds of torque, pounds of thrust or percentage of either.

While this apparatus has been described primarily here as a thrustmeter, it will be appreciated by those skilled in the art that with the use of two stacks and sensing units, that is two sets of sensing shafts 29, operating upon separate electrical wafer stacks that torque may be measured provided that one of the units is placed forwardly of the engine mount and the other rearwardly at the side opposite from the first unit so that the amount of change forward with respect to the amount of change rearward may be measured and converted into a torque reading.

Although I have disclosed herein the best forms of the invention known to me at this time, I reserve the right to all such modifications and changes as may come within the scope of the following claim.

What is claimed is:

For use with a prime mover mounted in a vehicular frame through a mount connection, a deflection measuring device for measuring the deflection of the prime mover mount between the prime mover and the vehicular body incident to increases and decreases of power output of the prime mover comprising means carried by the vehicular frame and positioned to engage the prime mover mount means, a resistance stack carried by said vehicular frame comprising wafers of both carbon and metal in a housing for producing an electrical value proportional to the mechanical deflection of the prime mover mount means, means carried by said resistance stack housing positioned to vary the resistance stack compression at no load for electrically zeroizing the stack in a metering circuit, probe means carried by said resistance stack housing positioned to be actuated by the prime mover mount means and to actuate by compression the electrical resistance stack for converting mechanical change of said engine mount into a proportional electrical output reflected in the metering circuit, and regulating means coaxial with and mechanically acting upon said probe means positioned to be actuated by the prime mover for regulating the linear throw of said means.

References Cited by the Examiner

UNITED STATES PATENTS

| | | | |
|---|---|---|---|
| 1,946,774 | 2/34 | Wilms | 73—88.5 |
| 2,136,257 | 11/38 | Thompson | 338—104 |
| 2,467,752 | 4/49 | Howe | 73—141 |
| 2,612,042 | 9/52 | Clarke | 73—141 |
| 2,680,373 | 6/54 | Bechberger | 73—88.5 |
| 2,930,227 | 3/60 | Spademan et al. | 73—141 |

RICHARD C. QUEISSER, *Primary Examiner.*